United States Patent [19]  [11] 4,074,598
Weck  [45] Feb. 21, 1978

[54] INFEED DEVICE FOR A TURNING MACHINE FOR FINISHING THE PERIPHERAL SURFACES OF ELONGATED WORKPIECES OF CYLINDRICAL CROSS-SECTION

[75] Inventor: Karl-Gustav Weck, Solingen, Germany

[73] Assignee: Kieserling & Albrecht Werkzeugmaschinenfabrik, Solingen, Germany

[21] Appl. No.: 703,937

[22] Filed: July 9, 1976

[30] Foreign Application Priority Data
July 12, 1975 Germany .............................. 2531320

[51] Int. Cl.² .............................................. B23B 5/00
[52] U.S. Cl. ........................................................ 82/20
[58] Field of Search ............................................. 82/20

[56] References Cited
U.S. PATENT DOCUMENTS

| | | | |
|---|---|---|---|
| 1,082,451 | 12/1913 | Snyder | 82/20 |
| 2,655,066 | 10/1953 | Siegerist | 82/20 |
| 3,899,943 | 8/1975 | Schaller | 82/20 |

FOREIGN PATENT DOCUMENTS 1,167,154  8/1960  Germany .............................. 82/20

Primary Examiner—Harrison L. Hinson
Attorney, Agent, or Firm—Michael J. Striker

[57] ABSTRACT

An infeed device for a turning machine for finishing the peripheral surfaces of elongated workpieces of circular cross-section includes at least one pair of inlet rolls in which the plane of symmetry of each roll normal to the axis thereof includes a small angle with the direction of movement of the workpieces through the machine, with the planes of symmetry of the two rolls of the pair inclined in opposite directions with respect to the direction of movement of the workpiece.

4 Claims, 6 Drawing Figures

INFEED DEVICE FOR A TURNING MACHINE FOR FINISHING THE PERIPHERAL SURFACES OF ELONGATED WORKPIECES OF CYLINDRICAL CROSS-SECTION

BACKGROUND OF THE INVENTION

The present invention relates to an infeed device for a turning or peeling machine for finishing the peripheral surfaces of elongated workpieces of circular cross-section, such as rods, wires and tubes in which the turning machine is provided with a rotating cutter head and in which the infeed device includes at least one pair of inlet or infeed rolls.

In such machines it can be observed that the workpieces which are turned or peeled in the machine leave the latter in slightly curved form bent along a large arc. This fact is of no importance if the workpieces are subsequently straightened in a straightening machine arranged aligned with, downstream and adjacent the peeling machine. If, however, the curved workpiece has to be adjusted in some form, there appear often irregularities which require an adjustment by hand or special complicated apparatus.

SUMMARY OF THE INVENTION

It is an object of the present invention to provide in a turning machine of the aforementioned kind an infeed device constructed in such a manner so that the workpieces leaving the machine have a form which is easily adjustable.

With these and other objects in view, which will become apparent as the description proceeds, the present invention relates to a turning machine with a rotating cutter head for finishing the peripheral surface of elongated workpieces of circular cross-section, such as rods, wires and tubes, movable in longitudinal direction through the machine while the cutter head revolves in a predetermined direction about the axis of a workpiece, in which the turning machine is provided with an infeed device comprising at least one pair of inlet rolls, each having a plane of symmetry normal to the axis thereof, and which the plane of symmetry of each roll of a pair is inclined through a small angle relative to the direction of movement of the workpiece through the machine, with the planes of symmetry of the rolls of at least one pair of rolls inclined in opposite directions with respect to the direction of movement of the workpiece. This construction will assure that the workpiece during its axial movement through the machine will carry out a slight turning about its longitudinal axis, whereby the finished workpiece will obtain a helical shape. The axes of the inlet rolls include respectively with the longitudinal axis of the workpiece an angle of less than 90°. The axes of the superimposed rolls of one pair of rolls include in a top view an angle with each other and this angle is twice the angle included between the plane of symmetry of each roll of the pair with the longitudinal axis of the workpiece. Since the twist imparted to the workpiece, due to the inclined position of the inlet rolls, will remain within the range of elastically deforming of the workpiece material, the present invention can also be used in finishing the outer surface of a wire taken from a coil.

According to a further feature of the present invention, the inclination of the axis of symmetry of the rolls in such that the workpieces engaged by the rolls are turned about the longitudinal axes thereof in the same direction as the cutter head rotates. This will assure that the drift imparted to the workpieces by the rotating cutter head is increased by the drift imparted to the workpiece by the inlet rolls so that the sum of the two drifts can never be zero. The turning movement of the workpieces during their machining and the substantial corkscrew shape of the finished workpieces are thus assured.

If a plurality of pairs of inlet rolls is provided, then the angle included between the plane of symmetry of each roll with the longitudinal axis of the workpiece is the same for the rolls in each pair of rolls, but this angle preferably increases in successive roll pairs toward the cutter head of the turning machine. This feature aims to divide the torsional moment imparted to the workpiece by the rotating cutter head substantially equal onto the plurality of roll pairs.

The angle which the plane of symmetry of each roll includes with the longitudinal axis is to be greater than zero but smaller than 10°, which will assure a sufficient helical shape of the finished workpiece, without unduly limiting the maximum cutting speed at which the cutting head may be operated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
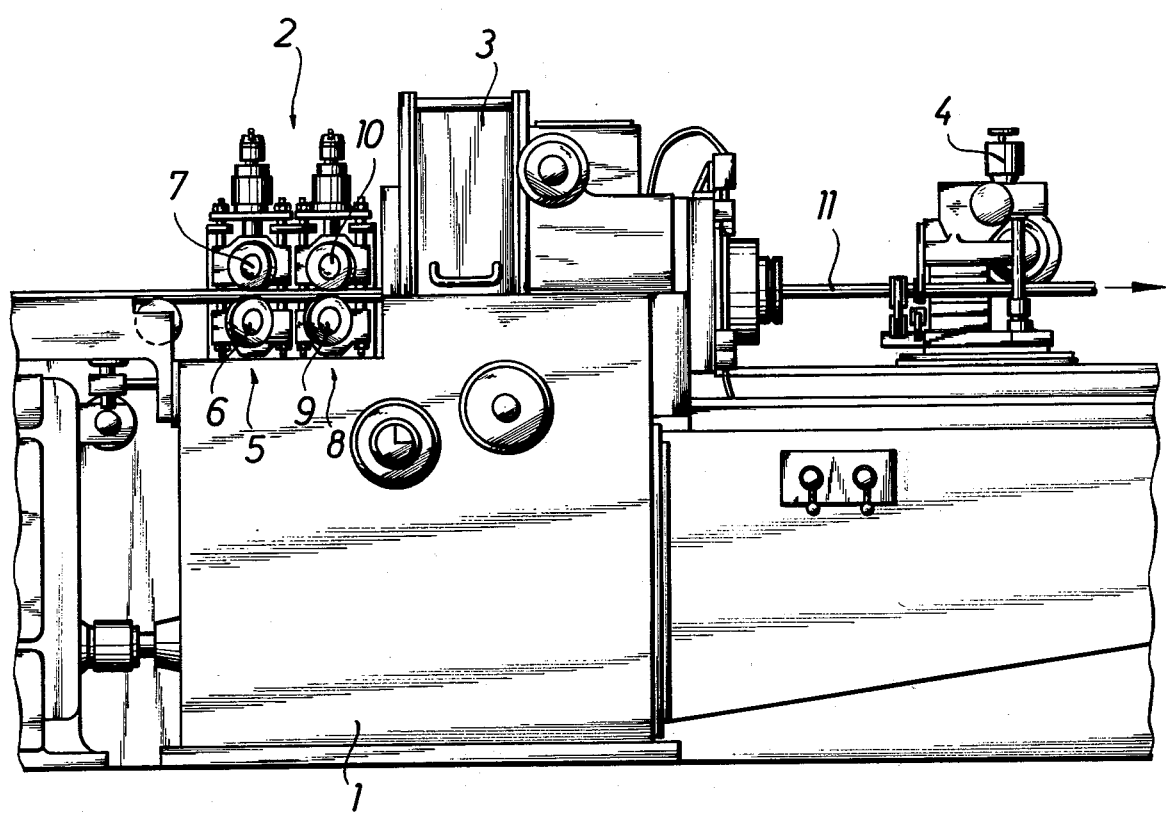
FIG. 1 is a side view of a bar turning or peeling machine provided with an infeed device according to the present invention.
Figure 2:
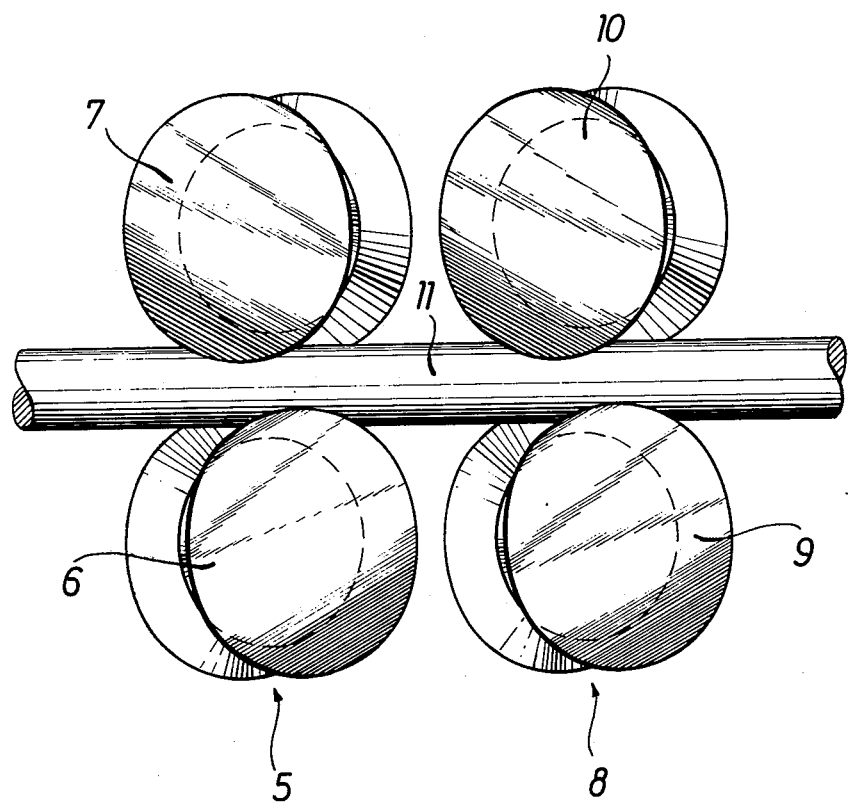
FIG. 2 is a schematic side view of the rolls of the infeed device with a workpiece engaged by the rolls.
Figure 3:
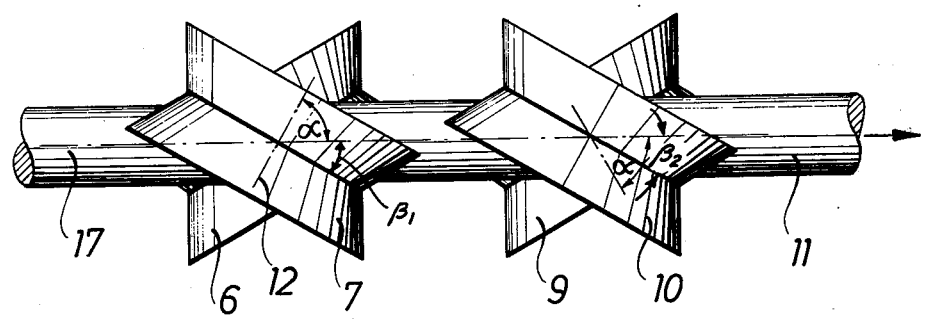
FIG. 3 is a top view of FIG. 2.

FIG. 1 illustrates in side view a bar turning or peeling machine 1, with an infeed device 2 according to the present invention, and a housing 3 for a rotating cutter head, which will be described later on in connection with FIG. 6. A withdrawal carriage 4 is provided downstream of the housing 3 for moving the workpiece 11 in longitudinal direction through the machine, or for supporting the movement of the workpiece imparted thereto by the infeed device 2, when the rolls of the latter are driven. The infeed device 2 has two pairs of cooperating rolls 5 and 8. The rolls 6 and 7 of the roll pair 5 as well as the rolls 9 and 10 of the roll pair 8 are synchronously adjustable in radial direction with respect to the workpiece, so that workpieces of different diameters may be properly engaged by the rolls. The infeed device 2 holds each workpiece in substantial alignment with a central opening provided in the cutter head. As shown in FIGS. 2 and 3, the rolls 6 and 7 of the roll pair 5 as well as the rolls 9 and 10 of the roll pair 8 are inclined with respect to the longitudinal axis of the workpiece 11.

The roll axes 12 include with the longitudinal axes of the workpiece 11 an angle $\alpha$ (FIG. 3) of less than 90°. The roll axes are, similar as the axes of rolls in a two-roll straightening machine, inclined to the workpiece axis. The axes of the rolls in each pair are inclined in opposite directions, but through the same angle with regard to the workpiece axis. The rolls have preferably a V-shaped profile to properly centralize the workpiece with respect to the rolls.

The angle $\beta$ included between the plane of symmetry of each roll and the longitudinal workpiece axis 17 is greater than zero but smaller than 10°, and preferably about 3°. The angle $\beta 1$ of the roll pair 5, which is spaced further from the cutting head in the housing 3, is preferably smaller than the angle $\beta 2$ of the roll pair 8 in order to distribute the moment imparted to the workpiece by the cutter head substantially equal to the two roll pairs.

Figure 4:
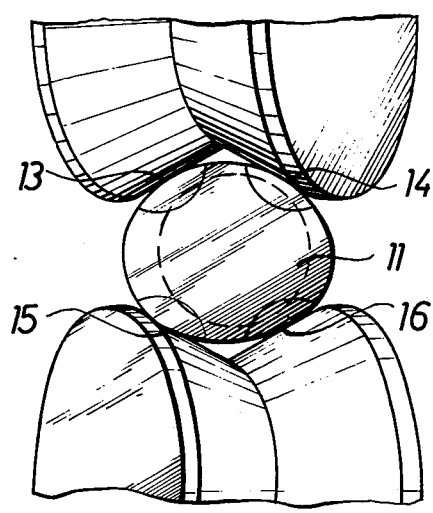
FIG. 4 illustrates a cross-section of a workpiece engaged between two inclined rolls, whereby for reason of clarity the section is not hatched.
Figure 5:
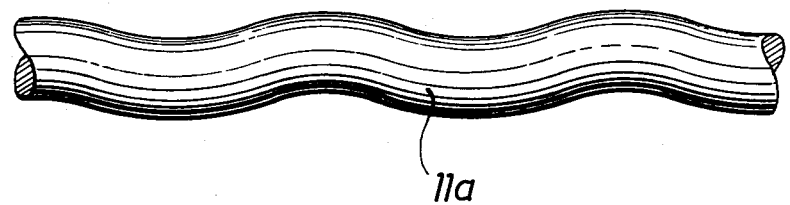
FIG. 5 is a side view of a finished workpiece in which the curvature imparted thereto is shown in an exaggerated manner.

The phenomenon of the bent workpieces can be explained that at the contact points 13–16 (FIG. 4) between the rolls and the workpiece such a strong pressure will occur that the adjacent regions of the workpieces will be hardened. Since during operation a slight offset between the center line of the workpiece and the center line of the cutter head is unavoidable, these hardened or compressed strips are unsymmetrically relieved so that the remaining tensions are not rectified and lead to the above-mentioned curvature of the workpiece. If the inlet rolls are, according to the present invention, inclined with respect to the workpiece axis there will result a finished workpiece 11a of helical shape, shown in exaggerated manner in FIG. 5, since the hardened strips of material turn in form of a helix about the workpiece axis.

Figure 6:
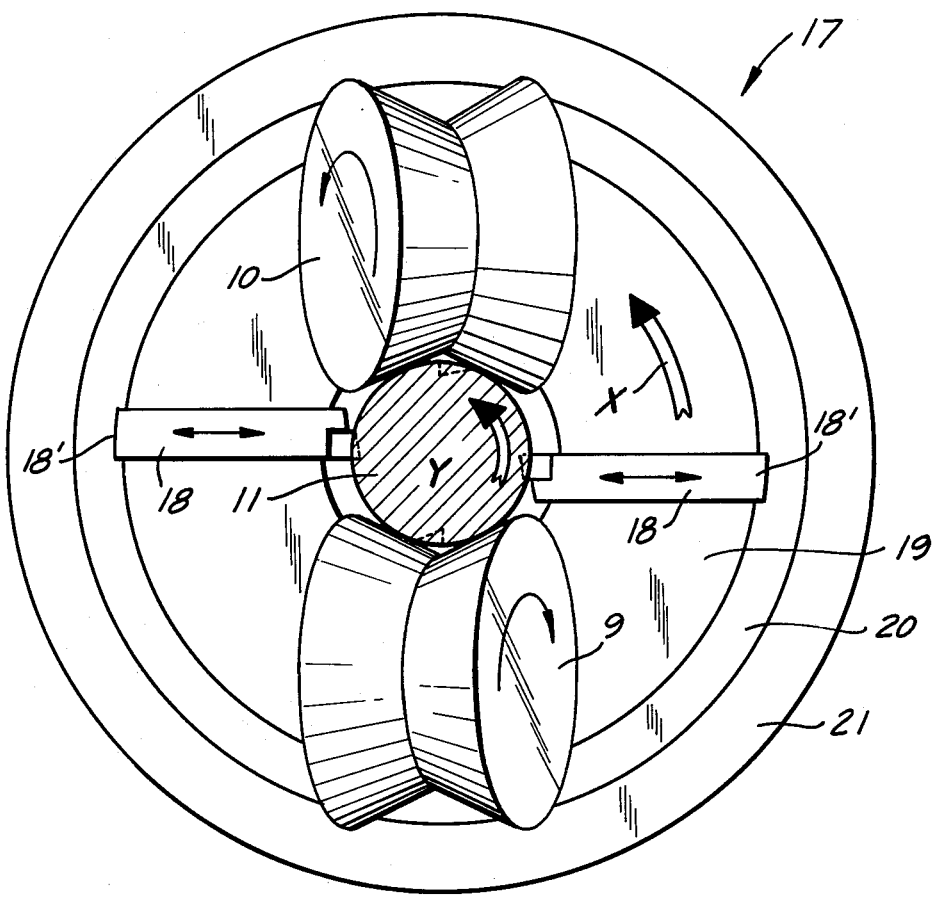
FIG. 6 is a schematic end view of the cutter head and showing also the rotation of the latter with respect to the rotation of the inlet rolls and the workpiece engaged thereby.

The cutter head 17, schematically illustrated in FIG. 6, comprises an internal substantially cylindrical member 19 provided with at least two substantially diametrically opposite arranged grooves in which cutting knives 18 are located, adjustable in the direction as shown by the double-headed arrows toward and away from the periphery of the workpiece 11 to be machined, which passes in longitudinal direction through a central opening of the member 19. The member 19 is surrounded by a bushing 20 having an internal conical surface engaging correspondingly shaped outer surfaces 18' of the cutting knives, and the bushing 20 is movable in axial direction relative to the member 19, by means well known in the art and not shown in the drawing, so as to adjust the radial position of the cutting knives 18. The bushing 20 is surrounded by a hollow shaft 21 which is driven about its axis by means not shown in the drawing. The central member 19, the bushing 20 and the hollow shaft 21 are connected by key means, not shown in the drawing, for simultaneous rotation in the direction of the arrow X, and it is to be understood that the key means connecting the members 19 and 20 with each other are constructed in such a manner that the member 19 may be shifted axially of the member 20. FIG. 6 shows also the inlet rolls 9 and 10 adjacent to the cutter head and the direction of rotation thereof so that the workpiece 11 is rotated as indicated by the arrow Y during feeding thereof in longitudinal direction.

It will be understood that each of the elements described above, or two or more together, may also find a useful application in other types of infeed devices for a turning machine for finishing the peripheral surfaces of elongated workpieces of cylindrical cross-section differing from the types described above.

While the invention has been illustrated and described as embodied in an infeed device for a turning machine for finishing the peripheral surfaces of elongated workpieces of cylindrical cross-secton, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended:

1. In a turning machine with a cutter head for finishing the peripheral surface of elongated workpieces of circular cross-section, such as rods, wires and tubes, movable in longitudinal direction through the machine while the cutter head revolves in a predetermined direction about the axis of a workpiece, an infeed device comprising at least one pair of inlet rolls, each having a peripheral surface of V-shaped cross-section and a plane of symmetry normal to the axis thereof, the plane of symmetry of each roll of a pair including with the direction of movement of the workpiece through the machine, an angle which is greater than zero and smaller than 10°, with the planes of symmetry of the rolls in said at least one pair of rolls inclined in opposite directions with respect to the direction of movement of the workpiece.

2. An infeed device as defined in claim 1, wherein the magnitude of the angle included between the plane of symmetry and the direction of movement of the workpiece is the same for both rolls of said at least one pair of rolls.

3. An infeed device as defined in claim 1, wherein the planes of symmetry of the rolls of said at least one pair of rolls are inclined to the direction of movement in such a manner so that a workpiece passing between the rolls is turned in said predetermined direction about its axis.

4. An infeed device as defined in claim 1, wherein said infeed device includes a plurality of pairs of rolls spaced from each other in said direction of movement of the workpiece, wherein the magnitude of the angle included between the plane of symmetry and the direction is the same for both rolls of each pair, with the magnitude of the angle in successive pairs increasing towards the cutter head.

* * * * *